(12) United States Patent
Ishikawa et al.

(10) Patent No.: US 8,424,410 B2
(45) Date of Patent: Apr. 23, 2013

(54) LINK MECHANISM

(75) Inventors: Tetsuya Ishikawa, Saitama (JP);
Susumu Miyazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 13/084,762

(22) Filed: Apr. 12, 2011

(65) Prior Publication Data

US 2011/0265598 A1 Nov. 3, 2011

(30) Foreign Application Priority Data

Apr. 28, 2010 (JP) ................................ 2010-103094

(51) Int. Cl.
*B25J 17/00* (2006.01)
(52) U.S. Cl.
USPC .................. 74/490.01; 74/490.05; 280/1.167; 901/1
(58) Field of Classification Search ............... 74/490.01, 74/490.02, 490.04, 490.05; 280/1.201, 1.204, 280/1.22, 1.167; 901/1, 11
See application file for complete search history.

(56) References Cited

U.S. PATENT DOCUMENTS

| | | | | |
|---|---|---|---|---|
| 3,888,023 A | * | 6/1975 | Genin | 434/256 |
| 5,214,749 A | * | 5/1993 | Brown | 700/260 |
| 7,096,983 B2 | * | 8/2006 | Hirai et al. | 180/8.1 |
| 7,099,747 B2 | * | 8/2006 | Mikami et al. | 700/245 |
| 7,410,338 B2 | * | 8/2008 | Schiele et al. | 414/4 |
| 7,581,465 B2 | * | 9/2009 | Sugawara et al. | 74/490.05 |
| 7,826,925 B2 | * | 11/2010 | Shishido et al. | 700/245 |
| 8,322,250 B2 | * | 12/2012 | Kim et al. | 74/490.05 |
| 8,336,420 B2 | * | 12/2012 | Carter et al. | 74/490.05 |

FOREIGN PATENT DOCUMENTS

| | | |
|---|---|---|
| JP | 2006-167832 A | 6/2006 |
| JP | 4319974 B2 | 8/2009 |

* cited by examiner

*Primary Examiner* — David M Fenstermacher
(74) *Attorney, Agent, or Firm* — Carrier Blackman & Associates, P.C.; Joseph P. Carrier; William D. Blackman

(57) ABSTRACT

A first link member 4 is swingably connected to the base member 2 on a forward side, and a second link member 5 is swingably connected to the base member 2 on a backward side. A third link member 6 is swingably connected to the output member 3 on the forward side, and a fourth link member 7 is swingably connected to the output member 3 on the backward side. A swinging end of the third link member 6 is swingably connected to the first link member 4 on a first connecting axis J5, and a swinging end of the fourth link member 7 on the backward side is swingably connected to the first link member 4 on a second connecting axis J6. A swinging end of the second link member 5 is swingably connected to the fourth link member 7 on a third connecting axis J7.

4 Claims, 6 Drawing Sheets

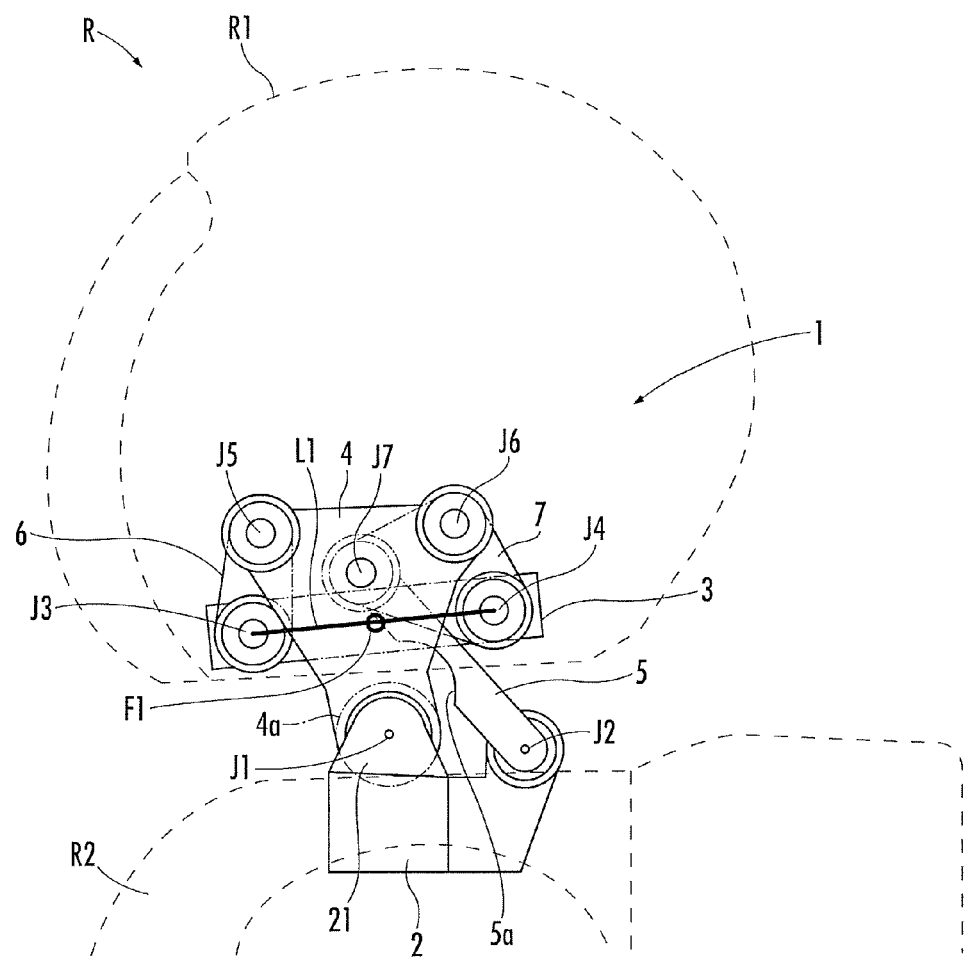
FIG.1
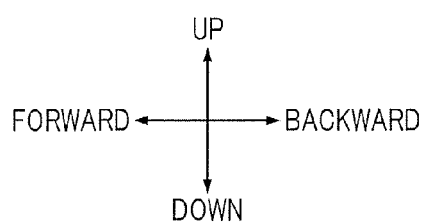

FIG.5
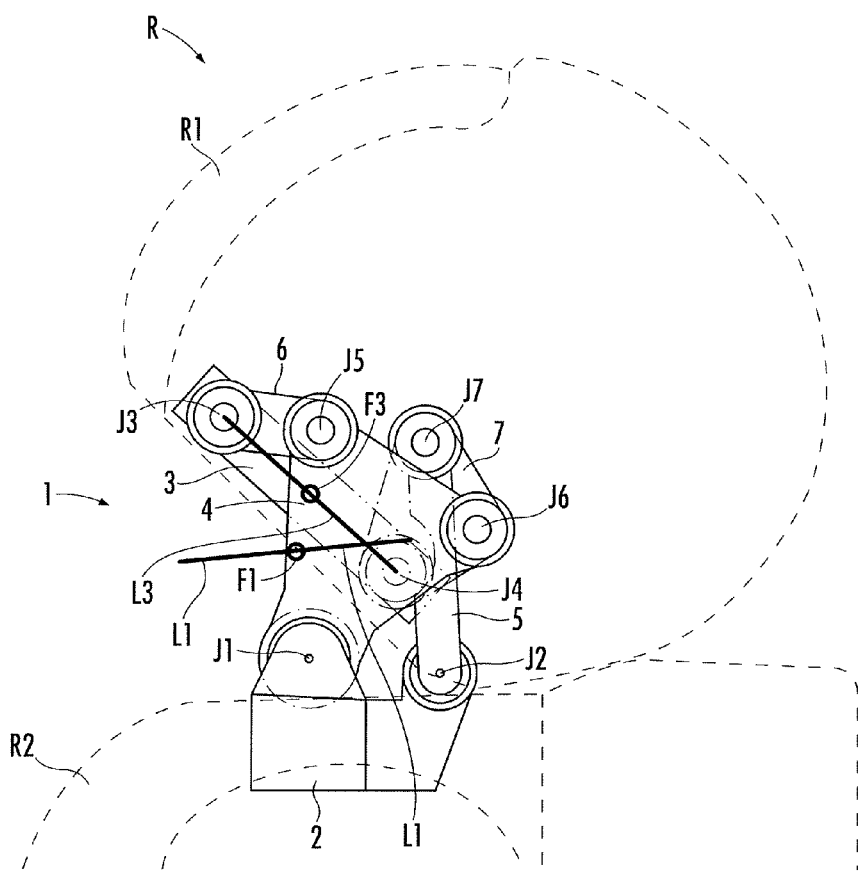
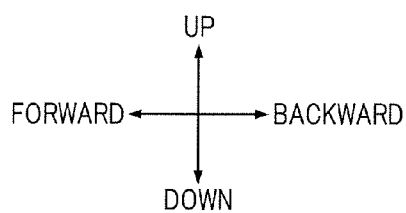

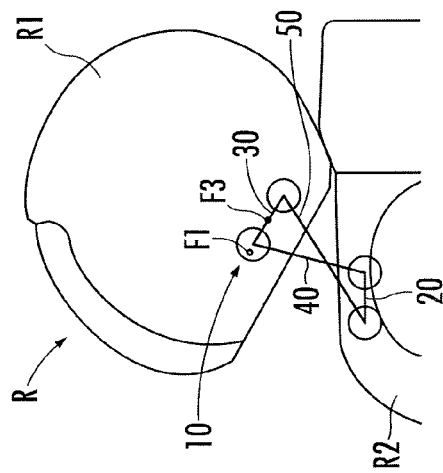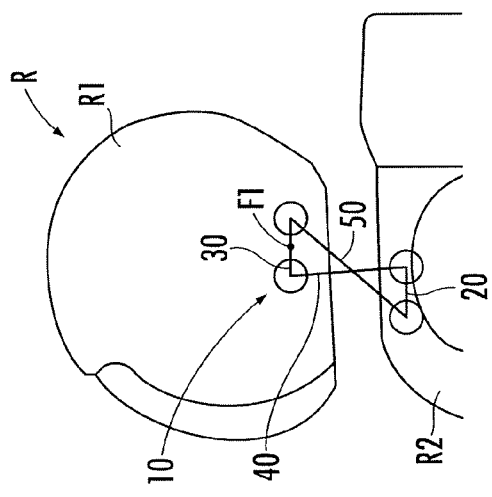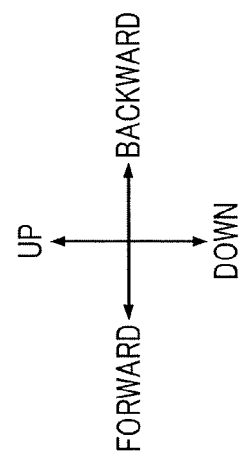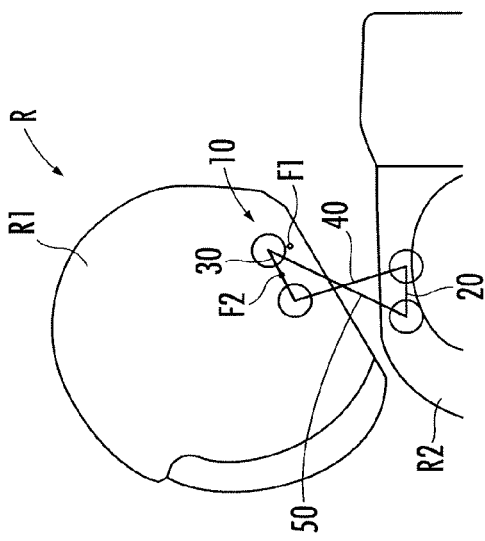

LINK MECHANISM

BACKGROUND OF THE INVENTION

1. Field of the Invention

The present invention relates to a link mechanism that swingably connects a swinging portion to a non-swinging portion.

2. Description of the Related Art

Conventionally, a link mechanism that connects a head (swinging portion) and a body (non-swinging portion) of a humanoid robot is known (e.g., see Japanese Patent No. 4319974). The link mechanism has a crosslink structure including: a base member fixed to the body; an output member fixed to the head; a first link member having an upper end swingably connected to a forward end of the output member and a lower end swingably connected to a backward end of the base member; and a second link member having an upper end swingably connected to a backward end of the output member and a lower end swingably connected to a forward end of the base member. According to such a structure, a movable angle of the head can be increased without an increase in clearance between the head and the body.

SUMMARY OF THE INVENTION

The present invention has an object of providing a link mechanism that can further increase the movable angle of the swinging portion as compared with the conventional art, without an increase in clearance between the swinging portion and the non-swinging portion.

To achieve the stated object, the present invention is a link mechanism that includes a plurality of link members, and connects a swinging portion and a non-swinging portion so that the swinging portion is swingable relative to the non-swinging portion, the link mechanism including: a base member fixed to the non-swinging portion; an output member fixed to the swinging portion; a first link member swingably provided on a part of the base member on one side of a swinging direction of the swinging portion; a second link member swingably provided on a part of the base member on an other side of the swinging direction of the swinging portion; a third link member swingably provided on a part of the output member on the side of the swinging direction; and a fourth link member swingably provided on a part of the output member on the other side of the swinging direction, wherein a swinging end of the third link member is swingably connected to the first link member, on a first connecting axis that is positioned at a part of the first link member on the side of the swinging direction and is farther from the non-swinging portion than the output member is, wherein a swinging end of the fourth link member on the other side of the swinging direction is swingably connected to the first link member, on a second connecting axis that is positioned at a part of the first link member on the other side of the swinging direction and is farther from the non-swinging portion than the output member is, and wherein a swinging end of the second link member is swingably connected to the fourth link member, on a third connecting axis that is positioned at a swinging end of the fourth link member on the side of the swinging direction.

According to this structure, in the case where the first link member is rotated to one side of the swinging direction relative to the base member, the fourth link member is restricted by a swinging range of the second link member, and accordingly swings to the other side of the swinging direction relative to the first link member about the second connecting axis. As a result, an end of the output member on the other side of the swinging direction moves away from the non-swinging portion. Hence, a larger movable angle of the swinging portion on one side of the swinging direction than in the conventional art can be attained.

Moreover, in the case where the first link member is rotated to the other side of the swinging direction relative to the base member, the fourth link member is restricted by the swinging range of the second link member, and accordingly swings to one side of the swinging direction relative to the first link member about the second connecting axis. As a result, the end of the output member on the other side of the swinging direction moves away from the non-swinging portion. Hence, a larger movable angle of the swinging portion on the other side of the swinging direction than in the conventional art can also be attained.

Thus, according to the present invention, the movable angle can be increased as compared with the conventional art, whichever side of the swinging direction the output member swings to.

In the present invention, it is preferable to provide an actuator which swings the first link member relative to the base member, about a swinging axis connecting the first link member and the base member.

In a conventional crosslink structure, a movable angular velocity of the output member increases with respect to a swinging angular velocity of any link member driven by the actuator. This raises a possibility of an increase in required torque and an increase in required current in the case of moving the swinging portion.

According to the structure of the present invention, however, the movable angular velocity of the output member with respect to the swinging angular velocity of the first link member can be decreased as compared with the conventional art. In this way, the required torque of the actuator can be reduced, thereby reducing the required current. Hence, a size reduction of a secondary battery associated with a size reduction and a volume reduction of an actuator and a reducer can be achieved.

As a specific embodiment, for example, the present invention is applicable to a neck joint of a humanoid robot. In this case, for example, the swinging portion is a head of the humanoid robot, the non-swinging portion is a body of the humanoid robot, the side of the swinging direction is forward, and the other side of the swinging direction is backward.

This enables forward-backward motion of the head of the humanoid robot to more closely resemble human motion, contributing to enhanced affinity of the humanoid robot.

BRIEF DESCRIPTION OF THE DRAWINGS

FIG. 1 is a side view schematically showing an upper portion of a humanoid robot that uses a link mechanism in an embodiment of the present invention.

FIG. 5 is a side view schematically showing a state of swinging the head of the humanoid robot backward in the embodiment.

FIG. 6 is a side view schematically showing an upper portion of a humanoid robot that uses a conventional link mechanism.

DESCRIPTION OF THE PREFERRED EMBODIMENTS

As shown in FIG. 1, a link mechanism 1 in an embodiment of the present invention is used in a neck joint of a humanoid robot R that includes a head R1 as a swinging portion and a body R2 as a non-swinging portion, to rotate the head R1 in a forward-backward direction relative to the body R2.

Figure 2:
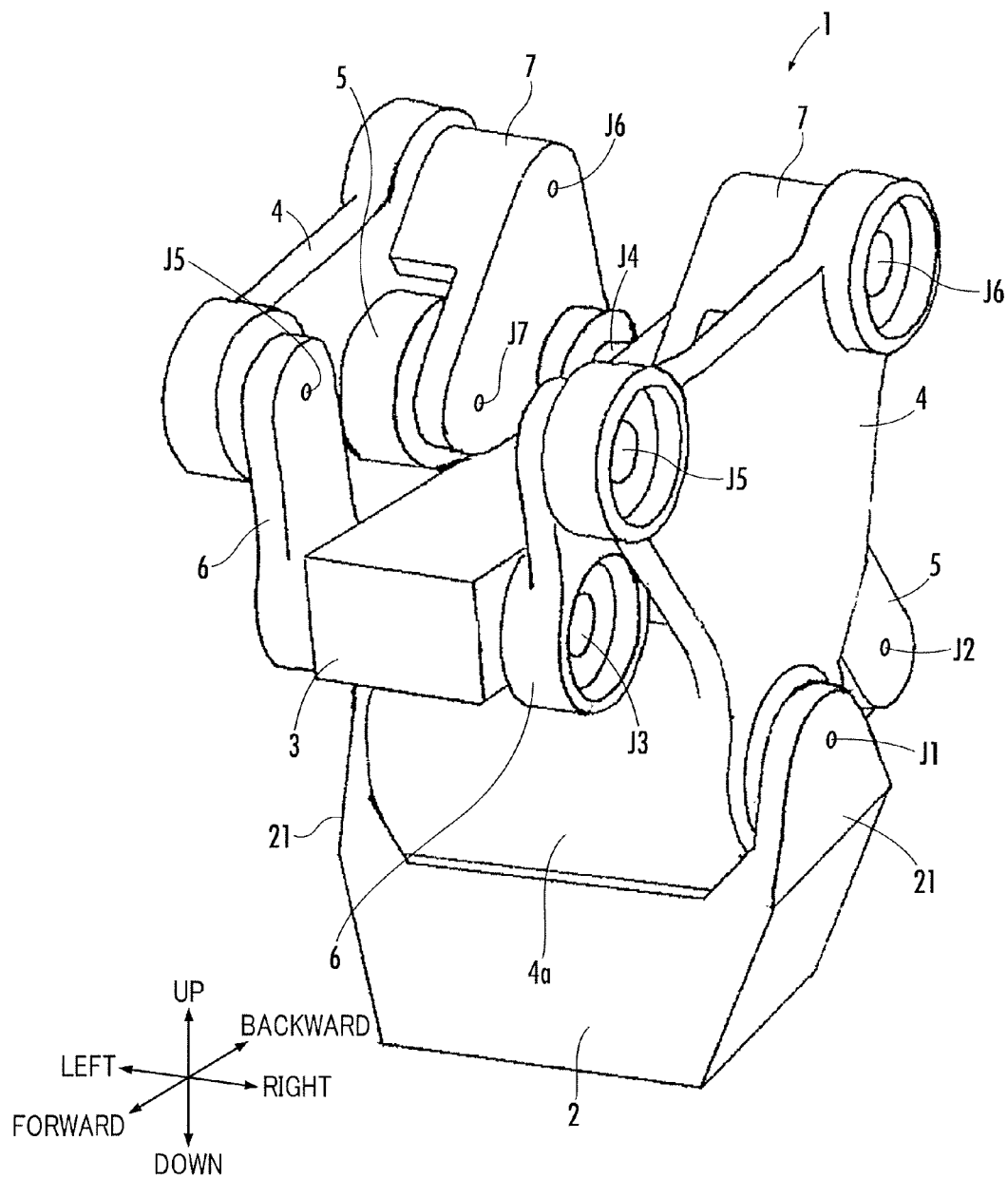
FIG. 2 is a perspective view schematically showing the link mechanism in the embodiment.
Figure 3:
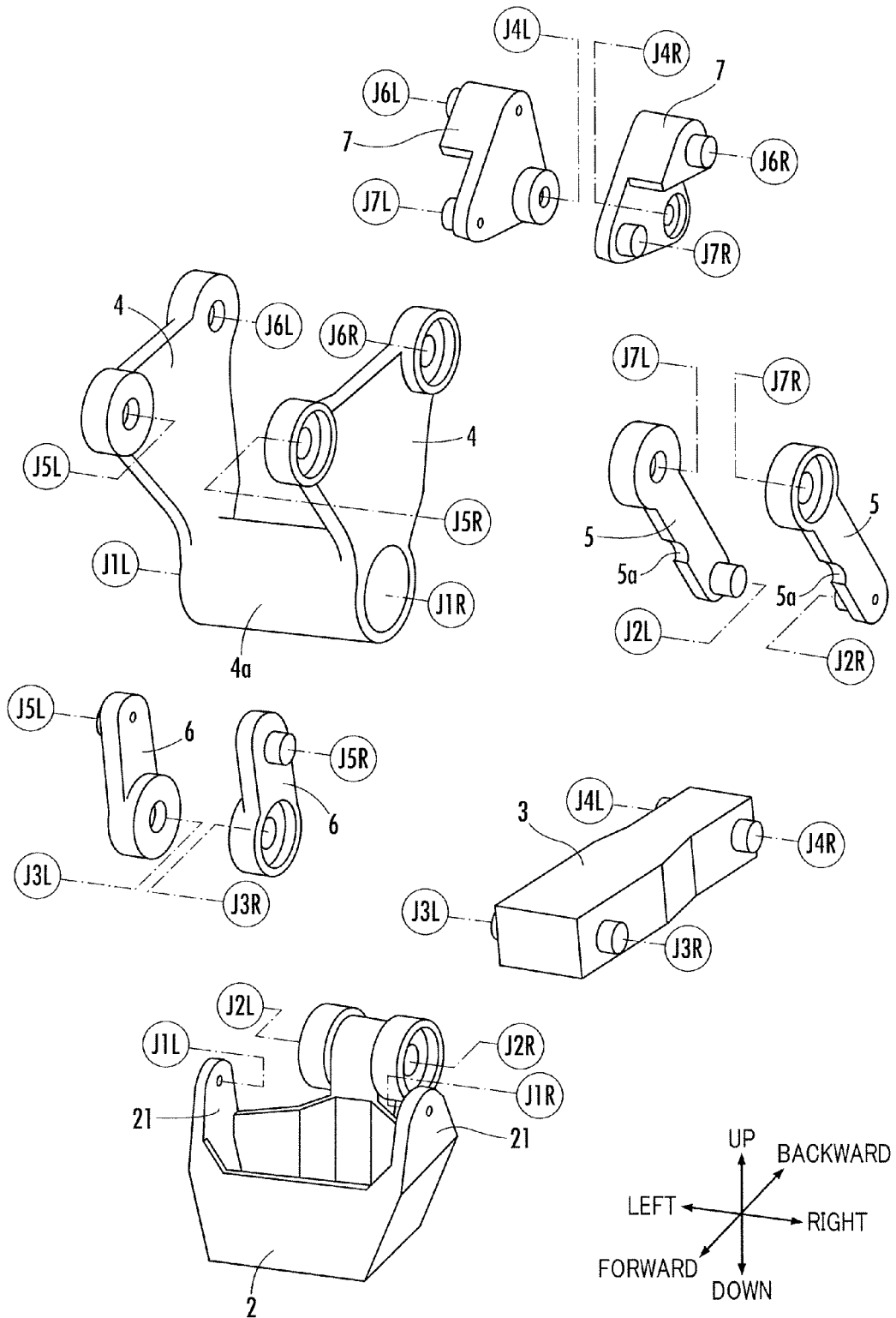
FIG. 3 is a perspective view schematically showing a disassembled state of the link mechanism in the embodiment.

With reference to FIGS. 1 to 3, the link mechanism 1 includes a base member 2 fixed to the body R2 via a turning mechanism (not shown), and an output member 3 fixed to the head R1 via a left-right swinging mechanism (not shown). A part of the base member 2 on a forward side (one side of a swinging direction of the head R1 as the swinging portion) has a pair of protrusions 21 protruding upward, which are apart from each other in a left-right direction. A pair of first link members 4 are swingably connected to inner sides of the pair of protrusions 21 in the left-right direction.

The first link members 4 are connected to each other via a tubular portion 4a, at their parts connected to the protrusions 21 of the base member 2. An electric motor (not shown) as an actuator is contained in the tubular portion 4a, and the first link members 4 are rotated forward and backward relative to the base member 2 by this electric motor. The first link members 4 each have a substantially triangular shape that gradually widens in the swinging direction toward a swinging end. A pair of second link members 5 each having a substantially rodlike shape are swingably connected to a part of the base member 2 on a backward side (the other side of the swinging direction of the head R1).

A pair of third link members 6 each having a substantially rodlike shape are provided on a part of the output member 3 on the forward side, swingably about a head forward connecting axis J3. A swinging end of each first link member 4 on the forward side and a swinging end of each third link member 6 are connected to each other above the output member 3 (a position that is farther from the body R2 than the output member 3 is), swingably about a first connecting axis J5. A pair of fourth link members 7 each having a substantially triangular shape are provided on a part of the output member 3 on the backward side, swingably about a head backward connecting axis J4. Each fourth link member 7 has ends connected to other members at three connecting axes J4, J6, and J7.

A swinging end of each first link member 4 on the backward side and a swinging end of each fourth link member 7 on the backward side are connected to each other, swingably about the second connecting axis J6. A swinging end of each second link member 5 and a swinging end of each fourth link member 7 on the forward side are connected to each other, swingably about the third connecting axis J7.

A length dimension of each of the link members 4, 5, 6, and 7 included in the link mechanism 1 in the embodiment is set so that, with respect to a movable angular velocity (a displacement amount of tilt per unit time) of the first link members 4, a movable angular velocity of the output member 3 is equal or slower, i.e., so that a reduction ratio is not less than 1.

Here, a swinging centerline axis about which the first link members 4 rotate relative to the base member 2 is denoted as a body forward stationary axis (swinging axis) J1, a swinging centerline axis about which the second link members 5 rotate relative to the base member 2 is denoted as a body backward stationary axis J2, a swinging centerline axis about which the third link members 6 rotate relative to the output member 3 is denoted as the head forward connecting axis J3, and a swinging centerline axis about which the fourth link members 7 rotate relative to the output member 3 is denoted as the head backward connecting axis J4.

Moreover, a swinging centerline axis about which the first link members 4 and the third link members 6 rotate relative to each other is denoted as the first connecting axis J5, a swinging centerline axis about which the first link members 4 and the fourth link members 7 rotate relative to each other is denoted as the second connecting axis J6, and a swinging centerline axis about which the second link members 5 and the fourth link members 7 rotate relative to each other is denoted as the third connecting axis J7.

F1 shown in FIG. 1 is a first center point indicating a center of a first straight line L1 connecting the head forward connecting axis J3 and the head backward connecting axis J4. Note that the signs "J1L" to "J7L" and "J1R" to "J7R" in FIG. 3 indicate that the link members shown with the same signs are swingably connected to each other.

Figure 4:
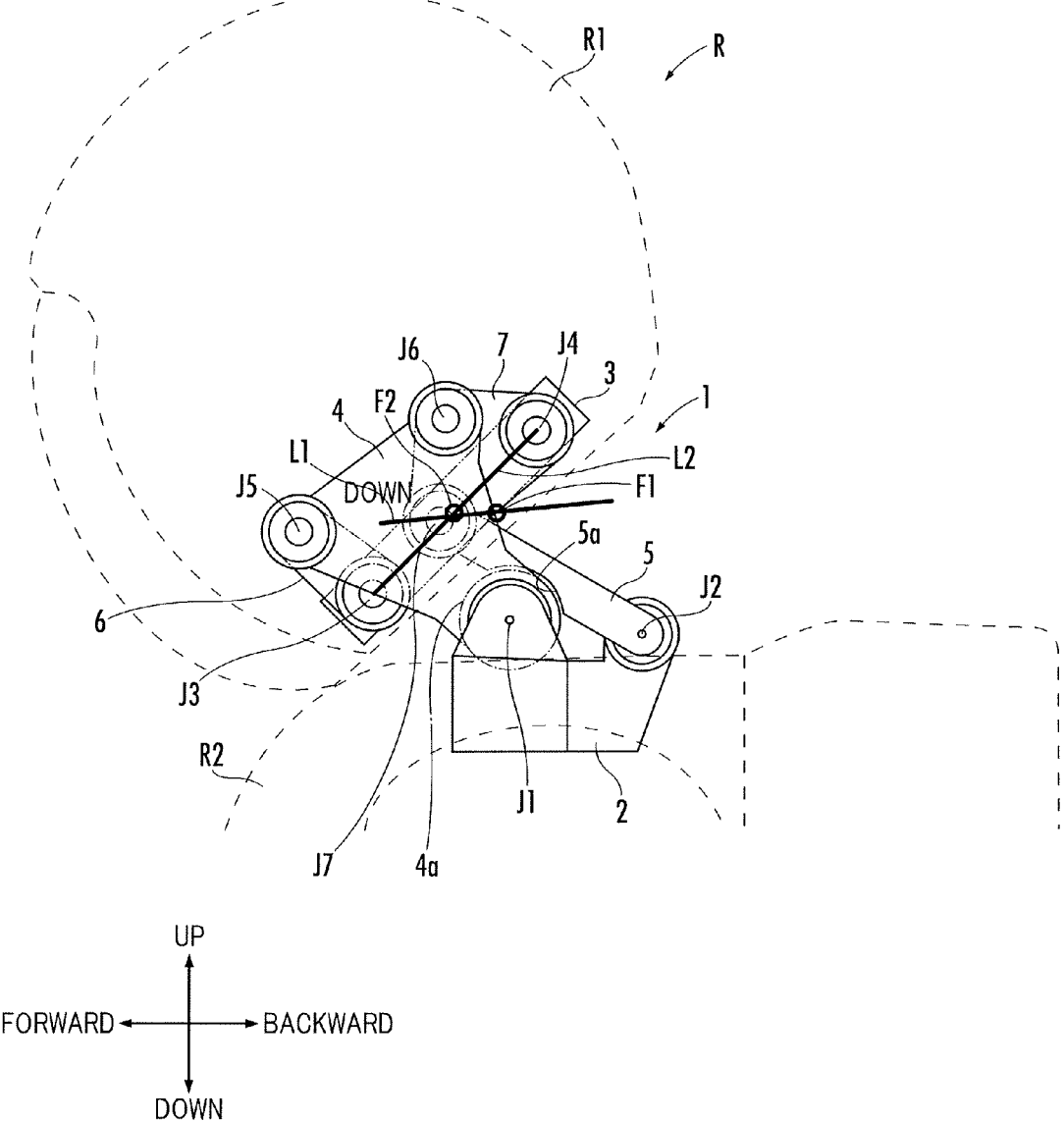
FIG. 4 is a side view schematically showing a state of swinging a head of the humanoid robot forward in the embodiment.

As shown in FIG. 4, in the case where the first link members 4 are rotated forward relative to the base member 2 by the electric motor, the fourth link members 7 are restricted by a swinging range of the second link members 5 relative to the base member 2, and accordingly rotate backward about the second connecting axis J6 connecting to the first link members 4. As a result, the part of the output member 3 on the backward side moves upward (away from the body R2).

A second center point F2 at a center of a second straight line L2 connecting the head forward connecting axis J3 and the head backward connecting axis J4 at this time is shifted forward from the first center point F1 and also is substantially unchanged in the upward-downward direction, as can be seen from FIG. 4.

Moreover, as shown in FIG. 5, in the case where the first link members 4 are rotated backward relative to the base member 2 by the electric motor, the fourth link members 7 are restricted by the swinging range of the second link members 5 relative to the base member 2, and accordingly rotate forward about the second connecting axis J6 connecting to the first link members 4. As a result, the part of the output member 3 on the forward side moves upward (away from the body R2).

A third center point F3 at a center of a third straight line L3 connecting the head forward connecting axis J3 and the head backward connecting axis J4 at this time is shifted backward and upward from the first center point F1, as can be seen from FIG. 5.

A conventional crosslink link mechanism 10 is described below with reference to a schematic view of FIG. 6, as a comparison with the link mechanism 1 in the embodiment. FIG. 6(a) shows a state where the head R1 of the humanoid robot R is rotated forward from a state of FIG. 6(b), and FIG. 6(c) shows a state where the head R1 is rotated backward from the state of FIG. 6(b).

The conventional link mechanism 10 includes: a base member 20 fixed to the body R2; an output member 30 fixed to the head R1; a first link member 40 having an upper end swingably connected to a forward end of the output member 30 and a lower end swingably connected to a backward end of the base member 20; and a second link member 50 having an upper end swingably connected to a backward end of the output member 30 and a lower end swingably connected to a forward end of the base member 20. The second link member 50 is longer than the first link member 40.

As is clear from FIG. 6, in the conventional link mechanism 10, in the case where the head R1 is rotated forward, the second center point F2 at the center between both swinging axes of the output member 30 is positioned higher than the first center point F1 at the center between both swinging axes of the output member 30 in the state of FIG. 6(b). However, in the case where the head R1 is rotated backward, the third center point F3 at the center between both swinging axes of the output member 30 is positioned lower than the first center point F1.

FIG. 6 merely shows one example of crosslink link mechanism. However, generally in a crosslink link mechanism, the center point when swinging to at least one side of the swinging direction is positioned lower than the first center point F1 in the upright posture state of FIG. 6(b). When the center point at the time of swinging is positioned lower than the first center point F1 as in FIG. 6(c), the head R1 and the body R2 are more likely to contact each other. This causes a limited movable angle of the head R1.

On the other hand, in the link mechanism 1 in the embodiment, the second center point F2 and the third center point F3 are not positioned significantly lower than the first center point F1, unlike the conventional art. Therefore, in the link mechanism 1 in the embodiment, the output member 3 can be rotated forward and backward to a larger degree and so the movable angle of the head R1 can be increased as compared with the conventional art, without an increase in clearance between the head R1 and the body R2. Moreover, motion that more closely resembles human motion than in the conventional art can be realized, which contributes to enhanced affinity of the humanoid robot.

The conventional link mechanism 10 shown in FIG. 6 has an electric motor (not shown) that swings the second link member 50 connected to the backward end of the output member 30 relative to the output member 30. Here, a movable angular velocity of the output member 30 (a relative angular velocity to a horizontal line, i.e., a displacement amount of tilt of the output member 30 per unit time) is increased to about twice a movable angular velocity of the second link member 50 (a displacement amount of tilt of the second link member 50 relative to the output member 30 per unit time).

Accordingly, when the movable angular velocity of the output member 30 is "1", the electric motor needs to be driven so that the second link member 50 swings at a velocity of about "0.5" with respect to the movable angular velocity of the output member 30.

Hence, in the conventional link mechanism 10, the required torque of the electric motor increases when swinging the head R1. This causes an increase in required current, as compared with the case where the reduction ratio is not less than 1 (equal or slower velocity).

On the other hand, in the link mechanism 1 in the embodiment, the movable angular velocity of the output member 3 (this movable angular velocity is a relative angular velocity to a horizontal line, and is a displacement amount of tilt of the output member 3 per unit time) with respect to the swinging angular velocity of the first link member 4 (a displacement amount of tilt relative to the base member 2 per unit time) is slower (lower) than in the conventional art, so that a reduction ratio not less than 1 (equal or slower velocity) can be realized. Therefore, the required torque of the electric motor as an actuator for swinging the first link members 4 can be reduced, thereby reducing the required current.

Besides, by setting the position of each of the axes J1 to J7 so that the swinging angular velocity of the first link member 4 is equal to the movable angular velocity of the output member 3, the need to calculate the movable angle of the output member 3 from the swinging angle of the first link member 4 can be eliminated. This facilitates control of forward-backward swinging of the head R1.

What is claimed is:

1. A link mechanism that includes a plurality of link members, and connects a swinging portion and a non-swinging portion so that the swinging portion is swingable relative to the non-swinging portion, the link mechanism comprising:
   a base member fixed to the non-swinging portion;
   an output member fixed to the swinging portion;
   a first link member swingably provided on a part of the base member on one side of a swinging direction of the swinging portion;
   a second link member swingably provided on a part of the base member on an other side of the swinging direction of the swinging portion;
   a third link member swingably provided on a part of the output member on the side of the swinging direction; and
   a fourth link member swingably provided on a part of the output member on the other side of the swinging direction,
   wherein a swinging end of the third link member is swingably connected to the first link member, on a first connecting axis that is positioned at a part of the first link member on the side of the swinging direction and is farther from the non-swinging portion than the output member is,
   wherein a swinging end of the fourth link member on the other side of the swinging direction is swingably connected to the first link member, on a second connecting axis that is positioned at a part of the first link member on the other side of the swinging direction and is farther from the non-swinging portion than the output member is, and
   wherein a swinging end of the second link member is swingably connected to the fourth link member, on a third connecting axis that is positioned at a swinging end of the fourth link member on the side of the swinging direction.

2. The link mechanism according to claim 1, comprising an actuator which swings the first link member relative to the base member, about a swinging axis connecting the first link member and the base member.

3. The link mechanism according to claim 1, wherein the swinging portion is a head of a humanoid robot, the non-swinging portion is a body of the humanoid robot, the side of the swinging direction is forward, and the other side of the swinging direction is backward.

4. The link mechanism according to claim 2, wherein the swinging portion is a head of a humanoid robot, the non-swinging portion is a body of the humanoid robot, the side of the swinging direction is forward, and the other side of the swinging direction is backward.

* * * * *